United States Patent
Yang

(10) Patent No.: US 10,718,629 B2
(45) Date of Patent: Jul. 21, 2020

(54) APPARATUS AND METHOD FOR SEARCHING POINT OF INTEREST IN NAVIGATION DEVICE

(71) Applicants: HYUNDAI MOTOR COMPANY, Seoul (KR); KIA MOTORS CORPORATION, Seoul (KR)

(72) Inventor: Won Seok Yang, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 238 days.

(21) Appl. No.: 15/730,351

(22) Filed: Oct. 11, 2017

(65) Prior Publication Data

US 2018/0195875 A1 Jul. 12, 2018

(30) Foreign Application Priority Data

Jan. 9, 2017 (KR) .................... 10-2017-0003036

(51) Int. Cl.
*G01C 21/36* (2006.01)
*G06F 3/023* (2006.01)
*G06F 3/0488* (2013.01)
*G06F 16/29* (2019.01)

(52) U.S. Cl.
CPC ..... *G01C 21/3679* (2013.01); *G01C 21/3608* (2013.01); *G01C 21/3611* (2013.01); *G01C 21/3617* (2013.01); *G01C 21/3644* (2013.01); *G06F 3/0236* (2013.01); *G06F 3/04886* (2013.01); *G06F 16/29* (2019.01)

(58) Field of Classification Search
CPC ............ G01C 21/3679; G01C 21/3617; G01C 21/3644; G01C 21/3605–3611; G06F 16/29; G06F 3/0236; G06F 3/04886; G06F 16/9535; Y10S 707/99933–99936
USPC ............. 701/426, 487, 538, 539; 340/995.16
See application file for complete search history.

(56) References Cited

U.S. PATENT DOCUMENTS

| | | | |
|---|---|---|---|
| 2009/0030685 A1* | 1/2009 | Cerra ................. | G01C 21/3608 704/236 |
| 2010/0312469 A1* | 12/2010 | Chen ................. | G01C 21/3608 701/408 |
| 2011/0125398 A1* | 5/2011 | Bos ..................... | G01C 21/3611 701/465 |
| 2014/0207370 A1* | 7/2014 | Severson ........... | G01C 21/3608 701/427 |

* cited by examiner

*Primary Examiner* — Bao Long T Nguyen
(74) *Attorney, Agent, or Firm* — Morgan, Lewis & Bokius LLP

(57) ABSTRACT

A navigation device includes a touch screen configured to receive a search term and to display at least one Point To Interest (POI) information corresponding to the search term, a computer-readable memory configured to store a POI data by region, and a controller configured to split the search term into at least two parts including a front portion and a second portion next to the front portion, determine a target region based on the second portion, find a matched POI data among POI data related to the target region based on the whole of the search term, and output a search result as the at least one POI information into the touch screen.

19 Claims, 6 Drawing Sheets

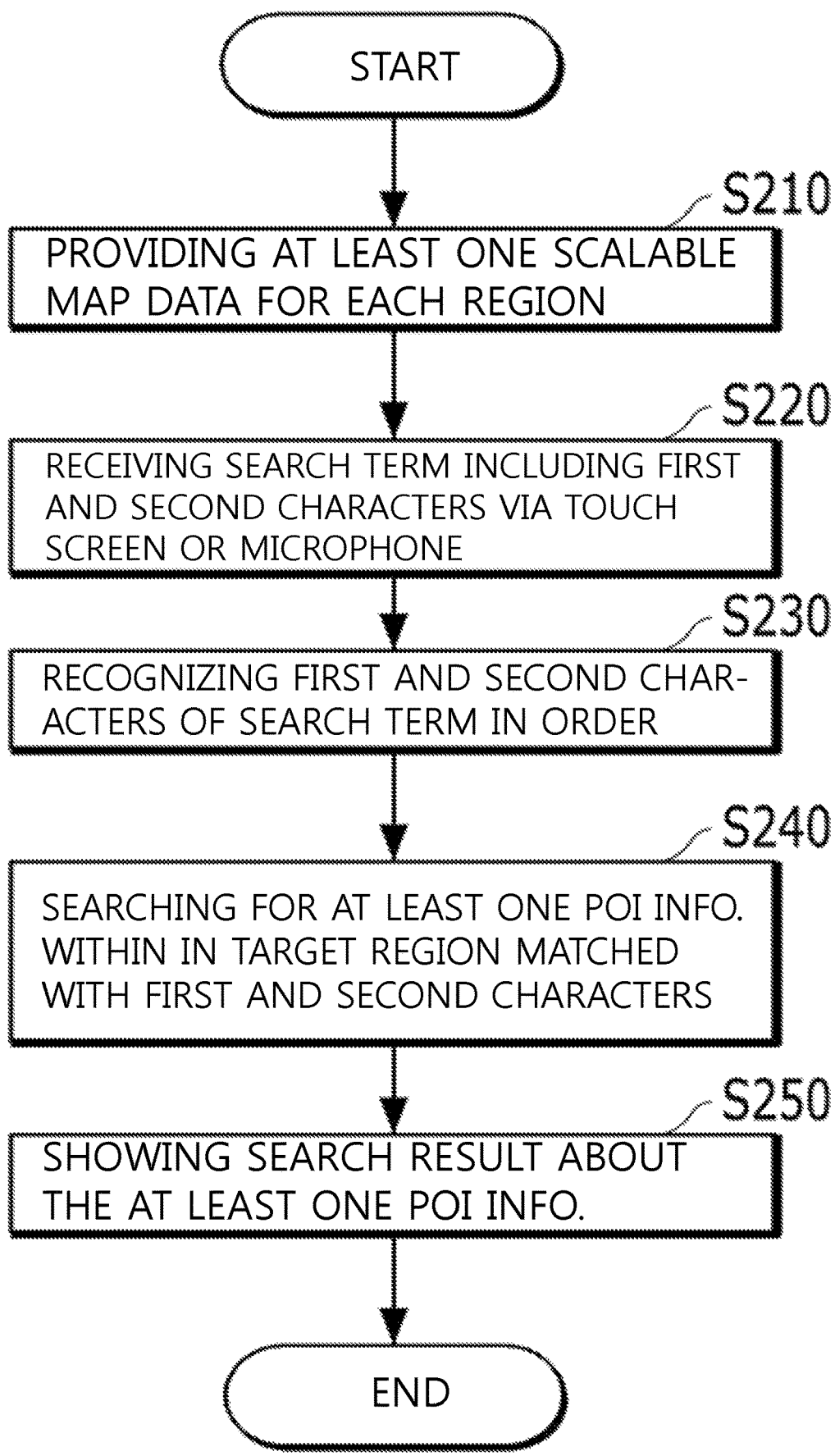

APPARATUS AND METHOD FOR SEARCHING POINT OF INTEREST IN NAVIGATION DEVICE

CROSS-REFERENCE TO RELATED APPLICATION

This application claims the benefit of priority to Korean Patent Application No. 10-2017-0003036, filed on Jan. 9, 2017 with the Korean Intellectual Property Office, which is hereby incorporated by reference as if fully set forth herein.

TECHNICAL FIELD

The present disclosure relates to a navigation device engaged with a vehicle, and more particularly, to a navigation device configured to recognize user's search term so as to search Point Of Interest (POI) information and a control method of the navigation device.

BACKGROUND

In a navigation device used in China or United States, a search operation targeted in the whole country is not effective because the navigation device includes a massive and voluminous Point Of Interest (POI) data in a memory. Accordingly, when a user uses the navigation device to search any address or information, the search function for POI information would be performed after she or he inputs or selects a name of province or a name of city. This control method is applicable to most navigation devices which are manufactured or sold in China and United States.

For enhancing efficiency, some of navigation devices may use a global positioning system (GPS) system to recognize current location of a vehicle first, automatically establish the current location based on GPS information to a target region, and provide a search function based on the target region.

That is, a conventional navigation device may acquire GPS information regarding current location of the vehicle from at least one GPS satellite, apply the GPS information on a map data or database (DB) so as to extract information about province or city where the vehicle is currently located, and, responsive to a search term, search POI information in a partial map data or DB associated with the information about province or city when the search term is inputted.

In other words, because of the size of the POI data or DB in the navigation device used in China or United States a search range would be restricted based on the information about province or city so as to maintain search performance because the search performance would be deteriorated when a search function for nationwide is performed.

However, it is inconvenient for a user who would like to search POI information in another region to reset the information about province or city, i.e., restart by inputting a name of another province, or city.

SUMMARY

The present disclosure provides a navigation device and a control method for searching Point Of Interest (POI) information in the navigation device through inputting a search term without inputting or pre-setting information of region, e.g., a regional code or names of province and city.

In embodiments, when a driver or a user inputs a single search term including plural words, syllables, characters or free morphemes, the navigation device can recognize each word, syllable, character or free morpheme from the single search term and determine a target region based on recognized word, syllable, character or free morpheme so as to narrow or restrict a search range of map data.

A navigation device may include a touch screen configured to receive a search term and to show at least one POI information corresponding to the search term; a computer-readable memory configured to store POI data by region; and a controller configured to split the search term into at least two parts including a front and a second portion, determine a target region based on the front portion, find a matched POI data among POI data related to the target region based on the whole of the search term, and output a search result as the at least one POI information into the touch screen.

The touch screen may be capable of displaying a virtual keypad. The controller may be further configured to recognize the search term by character, which is inputted through the virtual keypad.

The navigation device may further include a microphone configured to receive a voice corresponding to the search term, and the controller may be configured to convert the voice received through the microphone into a text and recognizes the text by character.

The search term may be recognized into the at least two parts, depending upon an attribute of writing system previously established.

The controller may be further configured to analyze the search term to make a history pattern, store or update the history pattern in the computer-readable memory, and load the history pattern whenever the search term is recognized.

The front portion may include at least two words/syllables/characters, and the history pattern may show which word/syllable/character could be matched with one of at least two names of different scaled places.

The controller may be further configured to determine the region based on the at least two words/syllables/characters in phases depending upon the history pattern.

In a case when the search term includes at least two words/syllables/characters, a first word/syllable/character and a second word/syllable/character may be matched with a name of province and a name of city respectively, or vice versa.

The controller may be configured to determine, portion when the front portion is not matched with any region, the target region based on the end.

The search term may be split into the at least two parts by free morpheme, and the controller may be configured to determine the target region based on at least one recognized free morpheme.

A method for searching a POI information in a navigation device may include storing POI information classified by region in a computer-readable memory; receiving a search term inputted through an interface; recognizing at least two parts contained in the search term, depending upon an attribute of a previously established writing pattern; retrieving, from the computer-readable memory, at least one POI information contained within a target region associated with one of the at least two parts; and displaying a searched result on a screen.

The screen may be capable of displaying a virtual keypad and receiving any input through the virtual keypad, and the controller may be configured to recognize the search term by character, which is inputted through the virtual keypad.

The method may further include receiving a voice corresponding to the search term through a microphone. Herein, the recognizing the at least two parts may include converting the voice into a text and splitting the text into the at least two parts.

Each part of the search term may include at least one free morpheme.

The method may further include analyzing the search term to make a history pattern; storing or updating the history pattern in the computer-readable memory; and loading the history pattern whenever the search term is recognized.

In the search term, the at least two parts may include a front portion and a second portion. Herein, the front portion may include at least two words/syllables/characters, and the history pattern may show which word/syllable/character could be matched with one of at least two names of different scaled places.

The method may further include, based on the history pattern, determining the region based on the at least two words/syllables/characters in phases.

In the front portion, a first word/syllable/character and a second word/syllable/character may be matched with a name of province and a name of city respectively, or vice versa.

The method may further include, when the front portion is not matched with any region, determining the target region based on the second portion.

An apparatus for searching a POI information, engaged with GPS device equipped with a vehicle, may include a processing system that includes at least one data processor and at least one computer-readable memory storing computer executable instructions. Herein, the processing system is configured to cause the apparatus to: store POI information classified by region in the at least one computer-readable memory; receive a search term inputted through an interface; recognize at least two parts contained in the search term depending upon an attribute of a previously established writing pattern; retrieve, from the at least one computer-readable memory, at least one POI information, contained within a target region associated with one of the at least two parts; and display a searched result on a screen.

Advantages, objects, and features of the disclosure will be set forth in part in the description which follows and in part will become apparent to those having ordinary skill in the art upon examination of the following or may be learned from practice of the subject matter disclosed herein. The objectives and other advantages of the disclosed subject matter may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosed subject matter. In the drawings:

FIG. 2 is a flowchart illustrating a point of interest (POI) search process of a navigation terminal according to an embodiment of the present disclosure.

DETAILED DESCRIPTION

Figure 1:
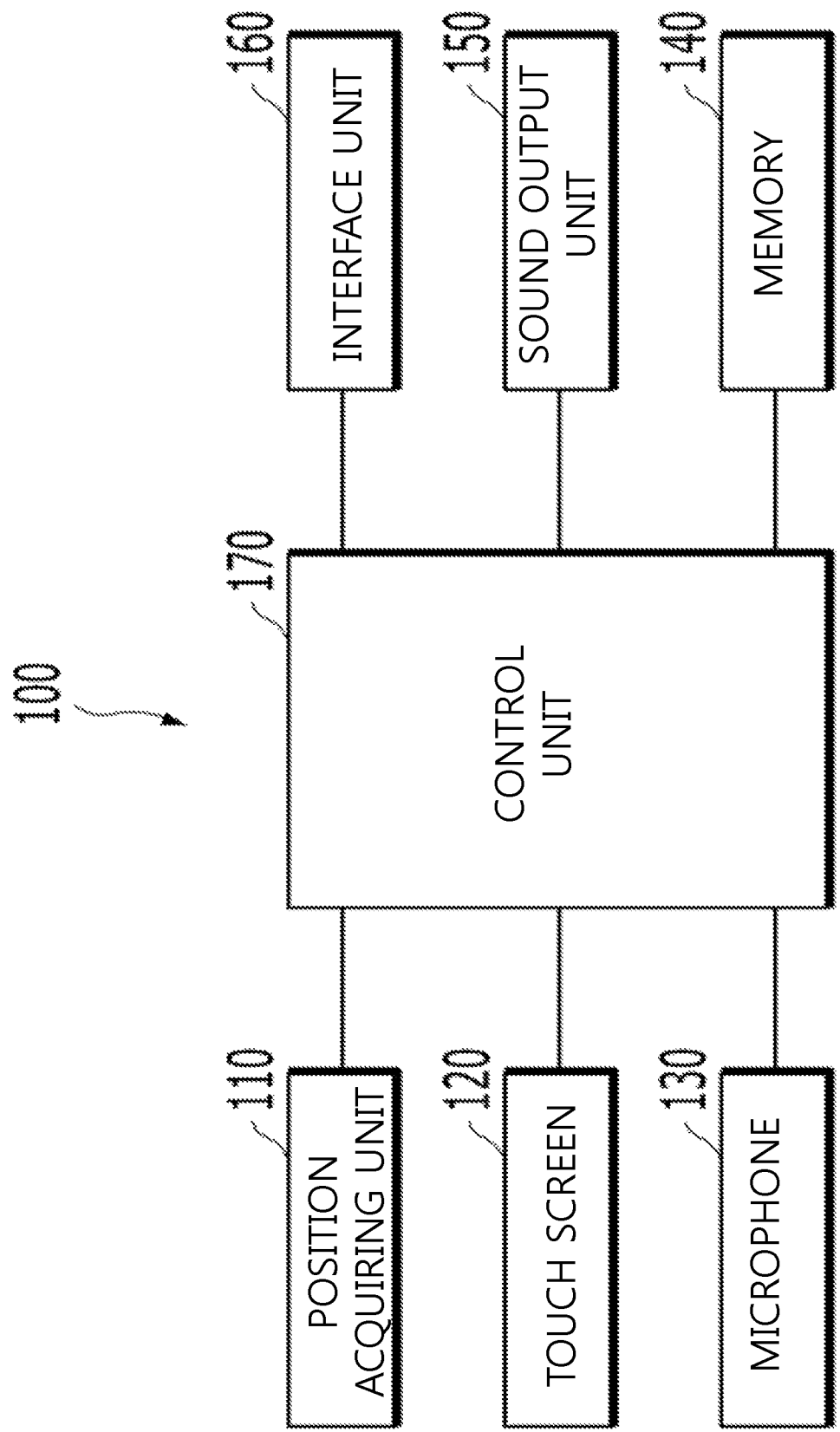
FIG. 1 is a block diagram showing an example of a navigation device mounted on a vehicle according to an embodiment of the present disclosure.

Reference will now be made in detail to the embodiments of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

Hereinafter, a point of interest (POI) search process of a navigation device mounted on a vehicle, to which embodiments of the disclosure could be applicable, will be described in detail, referring to FIGS. 1 to 4.

FIG. 1 is a block diagram showing an example of a navigation device mounted on a vehicle according to an embodiment of the present disclosure.

FIG. 2 is a flowchart illustrating a POI search process of a navigation terminal according to an embodiment of the present disclosure.

FIGS. 3 and 4 are diagrams for explaining a POI search process of a navigation terminal according to an embodiment of the present disclosure.

Referring to FIGS. 1 to 4, an in-vehicle navigation device 100 according to an embodiment of the present disclosure can be typically implemented with an Audio-Video-Navigation (AVN) device mounted on or equipped in a vehicle. The in-vehicle navigation device 100 may include a position acquiring unit 110, a touch screen 120, a microphone 130, a memory 140, a sound output unit 150, an interface unit 160, and a control unit 170.

The position acquiring unit 110 is a circuit or module configured to obtain position or location of the navigation device 100. A global positioning system (GPS) module could be a representative example of the position acquiring unit 110. Currently, receiving signals from three or more satellites, the GPS module may calculate distance information from the signals after reflecting accurate time information, and apply trigonometry to calculated distance information so that three-dimensional current position information pursuant to a latitude, a longitude and an altitude could be calculated accurately. For example, it is well-understood that signals delivered from three satellites are used for calculating location/position and time information while a signal delivered from another satellite is used for correcting an error of the calculated location/position and time information. Moreover, periodically or continuously calculating current position of vehicle in real time, the GPS module 110 may obtain information of vehicle speed.

The touch screen 120 may display various kinds of vehicle information (for example, speed, gearshift, fuel amount, fuel consumption, tire air pressure, etc.), which is delivered from the vehicle through the interface unit 160, as well as location of the vehicle, map information based on the location of the vehicle and the route guidance information to the destination, which are associated with the in-vehicle navigation device.

Also, the touch screen 120 may include a display unit and a touch sensor, and detect a touch input provided by a user or a driver via the touch screen.

The touch sensor may be implemented by at least one of various touch-sensing types such as a resistance film type, a capacitive type, an infrared type, an ultrasonic type and a magnetic field type so as to sense user's touch (or touch input) when a user or a driver touches the touch screen 120.

By way of example but not limitation, the touch sensor may be configured to convert pressure change at a specific portion of the touch screen 120 or capacitance change generated at the specific portion into an electrical input signal.

The touch sensor may be configured to detect a position(s), an area, pressure change at the time of touch, and the like, which occur when a touch object presses or touches on the touch screen. By way of example but not limitation, the touch object may include a finger, a touch pen, a stylus pen, a pointer, or the like, which is similar to an object pressing or touching a surface of the touch sensor to make a change of capacitance, pressure, or the like in the touch sensor.

When there is a touch input to the touch sensor, the corresponding signal(s) according to the change of capacitance, pressure, or the like may be delivered into a controller in the touch sensor. The controller processes or modifies the corresponding signal(s)/data to be transmitted to the control unit 170.

The control unit 170 can recognize which area of the touch screen 120 is touched or pressed, how many touch inputs have occurred, or the like. According to an embodiment, the controller may be configured to process or modify the corresponding signal(s)/data based on signals delivered from the touch sensor. Further, according to an embodiment, the control unit 170 may be provided with a processing system that includes at least one data processor and at least one computer-readable memory storing computer executable instructions.

Meanwhile, the control unit 170 may perform or execute different operation(s) or the same operation, based on a type of the touch object which presses or touches the touch screen 120. According to an embodiment, whether to perform or execute different operations or the same operation according to the type of the touch object may be determined by an operating state of the navigation device 100 and/or an application program being executed on the navigation device 100.

The microphone 130 converts an external acoustic signal (e.g., sound) into a voice data, which is a kind of electrical signal. The voice data can be applicable variously to functions or application programs executed or performed in the navigation device 100.

The memory 140 may be a non-transient computer readable medium containing computer executable instructions for causing a computer to perform operation(s) of the control unit 170, as well as temporarily storing input/output data used for the operation(s). The memory 140 may store information related to vibrations and sounds that might have various patterns, which are generated when a driver or a user makes a touch input on the touch screen 120.

In addition, the memory 140 can store a plurality of POI information which is classified or categorized for each region (e.g., each province, each city, each district, or the like) in a specific country, as well as store at least one scalable map data for each region.

The POI information may include at least one of GPS location information, name, image, telephone number, and official address for each of various facilities such as an airport, a terminal, a school, a department, a mall, a store, and the like.

As an example but not limitation, in a case of the navigation device 100 used in China or United States, the memory 140 can include plural POI information and map data, classified and/or categorized for each region such as state/province/county/city in China or United States.

The memory 140 may be a flash memory type, a hard disk type, a multimedia card micro type, a card type memory (for example, an SD or XD memory, or etc.), a random access memory (SRAM), a read-only memory (ROM), a programmable read-only memory (PROM), an electrically erasable programmable read-only memory (EEPROM), a magnetic tape, a magnetic disk, and/or an optical disk.

The sound output unit 150 may output audio data received externally or stored in the memory 140, depending upon an operation mode such as a communication mode or a recording mode, a voice recognition mode, a media output mode (broadcast, music, moving picture, etc.), and the like.

The sound output unit 150 may include a speaker, a buzzer, and a vehicle horn (klaxon).

The interface unit 160 may serve as a pathway for engaging the navigation device 100 with the vehicle, and may receive data regarding vehicle operation from the vehicle or distribute supplied power to each component included in the navigation device 100. By way of example but not limitation, the interface unit 160 may include an external charger port, a wired/wireless data port, a memory card port, an audio input/output (I/O) port, a video I/O port, an earphone port, and the like.

The control unit 170 controls the overall operation of the navigation device 100. According to an embodiment of the disclosure, the control unit 170 can recognize plural information contained in a single search term inputted by a user such as a driver or an occupant of the vehicle.

A conventional navigation device might not provide a search for overall or whole POI data stored in the memory 140 because its performance such as a search time, accuracy, etc. would deteriorate. Accordingly, a user or a driver may have to enter or select name of region (e.g., state, province, county, city, or the like) to limit a search scope in a map data before searching POI information. Particularly, one of the reasons why a conventional navigation device provides multi-step or hierarchical operation for searching any data (e.g., POI information) in a map data is the data structure of the map data. The map data might be generally classified or categorized based on regional information.

However, in an embodiment, the navigation device 100 can receive a single search term inputted by a user or a driver and recognize plural words, characters, syllables, or free morpheme included in the single search term. Herein, the single search term could include plural parts, depending upon an attribute of writing system previously established. For instance, the single search term can include plural portions including a front portion, a second portion next to the front portion, a third portion next to the second portion, and an end portion which is the last portion of the single search term. By way of example but not limitation, the search term (in English) might include several words such as "Shanghai Starbucks," "Reston Starbucks," or "New York Italian Food." In an English search term, each word might have a meaningful morpheme showing a name of region or a name of POI. But, in a case of Pekingese (Mandarin) for navigation device used in China, there is no spacing word in the search term. In the search term such as a Chinese term such as "北京星巴克咖啡店" ("Beijing Starbucks store" as translated in English), one or two character(s) could include a meaningful morpheme implying any name of region or any name of building, store, restaurant or the like. Accordingly, the navigation device 100 could recognize the search term by splitting the search term into plural parts, each part including a meaningful clue for a name of region, building, store, or the like. The navigation device 100 can find a clue related to the name of any region in the single search term to restrict the scope of search in a map data stored in the memory 140.

The control unit 170 can search at least one POI information included in a target region associated with a recognized part of the search term such as first and second characters, in the map data stored in the memory 140 and then display a search result, e.g., at least one POI information, on the touch screen.

Herein, when the navigation device 100 is used in China, the control unit 170 may recognize the search term by character because there is no space in the Chinese search term. For example, the navigation device 100 may determine a target region based on first two characters in the Chinese search term.

Herein, the control unit 170 may display a virtual keypad, including character keys which a user or a driver can use to input a search term, through the touch screen 120, and recognize at least two parts including a front and a second portion next to the front portion in the search term, e.g., inputted text given by the virtual keypad such as a QWERTY keyboard.

According to an embodiment, the control unit 170 recognizes a sound, e.g., user's voice inputted through the microphone 130, which can correspond to the search term, convert received sound into a text, and recognize some portion, e.g., first and second characters, within the converted text to determine a target region.

Herein, which portion would be used to determine a target region, e.g., a region for narrowing the scope of search, might be determined, depending upon an attribute of a previously established writing pattern. By way of example but not limitation, a first word/syllable/character/morpheme and a second word/syllable/character/morpheme may be matched with a name of province and a name of city respectively, or vice versa. In a case of Chinese search term such as "北京星巴克咖啡店" ("Beijing Starbucks store" as translated in English), first two characters "北京" ("Beijing" as translated in English) might be sufficient to determine a target region to narrow the scope of search on a map data included in the navigation device 100.

According to an embodiment, one of recognized first and second characters is a name of a specific area, and the other of the first and second characters may be a POI name to be searched in that area. For example, the name of the area may be the name of a province, a city, or an administrative district in a specific country, e.g., China or United States.

In a case of the Chinese search term "北京星巴克咖啡店" ("Beijing Starbucks store" as translated in English), first two characters "北京" are first inputted and recognized before other part "星巴克咖啡店" are given. Based on the first two characters, the control unit 170 can determine a target region (i.e., Beijing) to limit the scope of search, and then retrieve at least one POI information included in the other part "星巴克咖啡店" (i.e., "Starbucks store" as translated in English) from a map data stored in the memory 140.

For example, when a search term entered by a user includes "Shanghai" and "Beijing" sequentially, the control unit 170 can determine a target region based on the first word "Shanghai" and find POI information, at least partially matched with the second word "Beijing" in a map data limited based on the target region, i.e., search POI information including the name "Beijing" in Shanghai.

In above described example, two words "Shanghai" and "Beijing" both may imply a name of region. In an embodiment, the control unit 170 may use user's or driver's history pattern to determine which word would be used to determine a target region. Herein, user's or driver's history pattern could be stored in the memory 140. The navigation device 100 can monitor user's or driver's search terms during a predetermined time, and determine user's or driver's preference about whether a user or a driver enters a name of region first or later.

In some cases, plural words/characters/syllables may be matched with a single POI name. For example, a franchise name or a trade name can include a particular area name, e.g., a city name, a state name, or the like. When the franchise name or the trade name includes a specific area name, a front portion of the franchise name or the trade name (e.g., Chicago Steak Company) might be the specific area name (e.g., Chicago). Assuming that a New Yorker seeks any franchise store having a name such as Chicago Steak Company in the New York City, she or he can enter the search term "Chicago Steak Company." The navigation device 100 should show a store having the name of "Chicago Steak Company," not a store having the name of "Steak Company" in the city of Chicago. Thus, according to an embodiment, when the front portion of driver's or user's search term includes a specific area name, the navigation device 100 can recognize the whole of search term as a brand name, a trade name, a franchise name or the like.

According to an embodiment, the control unit 170 is further configured to analyze the search term to recognize and create a user's or driver's history pattern, store or update the history pattern in the memory 140, and load the history pattern stored in the memory 140 whenever the search term is entered.

According to an embodiment, if there is a name of region in front of a POI name, there may be a brand name including a local name in the POI name. Therefore, a search result based on the current location obtained from the position acquisition unit 110 as well as a POI search result of the recognized local name both may be simultaneously displayed on the touch screen.

That is, in an embodiment, the control unit 170 may acquire the current position through the position acquisition unit 110, and generate POI information including the POI name included in the search term within the current position, and POI information within a target region limited based on some words/syllables/characters included in the search term given by a user or a driver, so as to show both POI information together.

Meanwhile, when at least one POI information is retrieved based on user's search term, the control unit 170 can automatically set the scope of search on a map data stored in the navigation device 100 to a region corresponding to a name of region of the retrieved POI information found based on user's search term.

For example, even when regional information of the navigation device 100 has been previously set to "Beijing," the scope of search could be changed to another city "Shanghai" if a search result based on user's search term includes POI information which is all within the another city "Shanghai." That is, in response to the search result based on user's search term, the control unit 170 can change or adjust the name of region for POI search automatically.

In an embodiment, recognizing a POI name from the first word/syllable/character and a name of region from the second word/syllable/character, the control unit 170 can find POI information including both POI name and the name of region in a map data in the memory 140. It is possible to search for at least one POI information including the name and the name of region in order.

For example, when a search term given by a user is provided in the order of "Beijing (for POI name) Shanghai (for region name)", the control unit 170 can display all of POI information including two words "Beijing" and "Shanghai" in order as its name.

When a specific POI information is selected by a user from all POI information searched and displayed, the control unit 170 can show detailed contents about selected POI information or display a map including a location corresponding to the POI information. If the POI information or the location may be set as the destination, a path or a route from the current position to the location corresponding to the POI information may be determined by the control unit 170 and shown on the touch screen 120.

Referring to FIG. 2, the navigation device 100 may store a plurality of POI information categorized by each region of a specific country in the memory 140, and the process of searching POI information using the navigation device may include at S210 providing at least one scalable map data for each region, at S220 receiving a search term including first and second characters via an input device such as a touch screen or a microphone and at S230 recognizing the first and second characters of the search term in order (S230).

Then, the search process may further include at S240 searching for at least one POI information within in a target region matched with or corresponding to the recognized first and second characters in the memory 140, and at S250 showing a search result regarding the at least one POI information on the touch screen 120.

Herein, any one of the recognized first and second characters can be a name of the target region, and the other of the first and second characters may be a POI name to be searched within the target region.

In this case, the search process includes first recognizing the name of region based on the recognized first and second characters and then recognizing the POI name. This may include recognizing that the data associated with an area (or regional name or code) corresponding to the name of region could be something to search for. The scope of search could be narrow or limited without additional setting a regional name as a target area or entering a specific region in multi-step.

For example, when a search term entered by a user includes "Shanghai (for a target region) Beijing (POI name)" in order, the search process includes determining a target region as "Shanghai" and retrieving relevant POI information (e.g., a building of which name includes "Beijing") within Shanghai.

Further, when at least one POI information is retrieved and outputted based on user's search term, the search process includes automatically setting the scope of search to a particular region corresponding to the name of region implied in the search term or included in detailed information of retrieved POI information.

In an embodiment, when a POI name first and a name of region later from recognized first and second words/characters/syllables is recognized, a search for least one POI information including the POI name and the area name in order from the memory is performed.

Figure 3A:
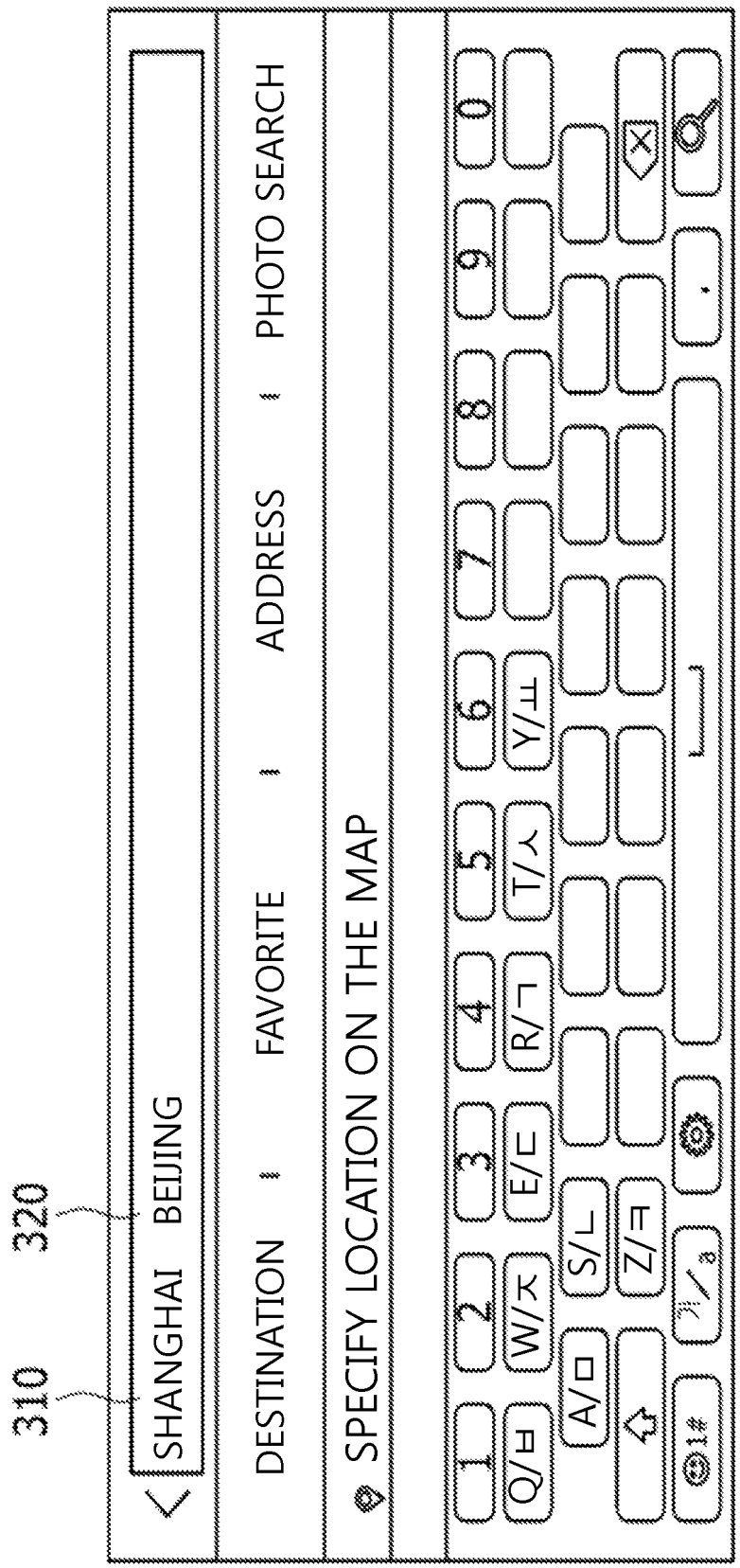
FIGS. 3A, 3B, 4A and 4B are diagrams for explaining a POI search process of a navigation terminal according to an embodiment of the present disclosure.
Figure 3B:
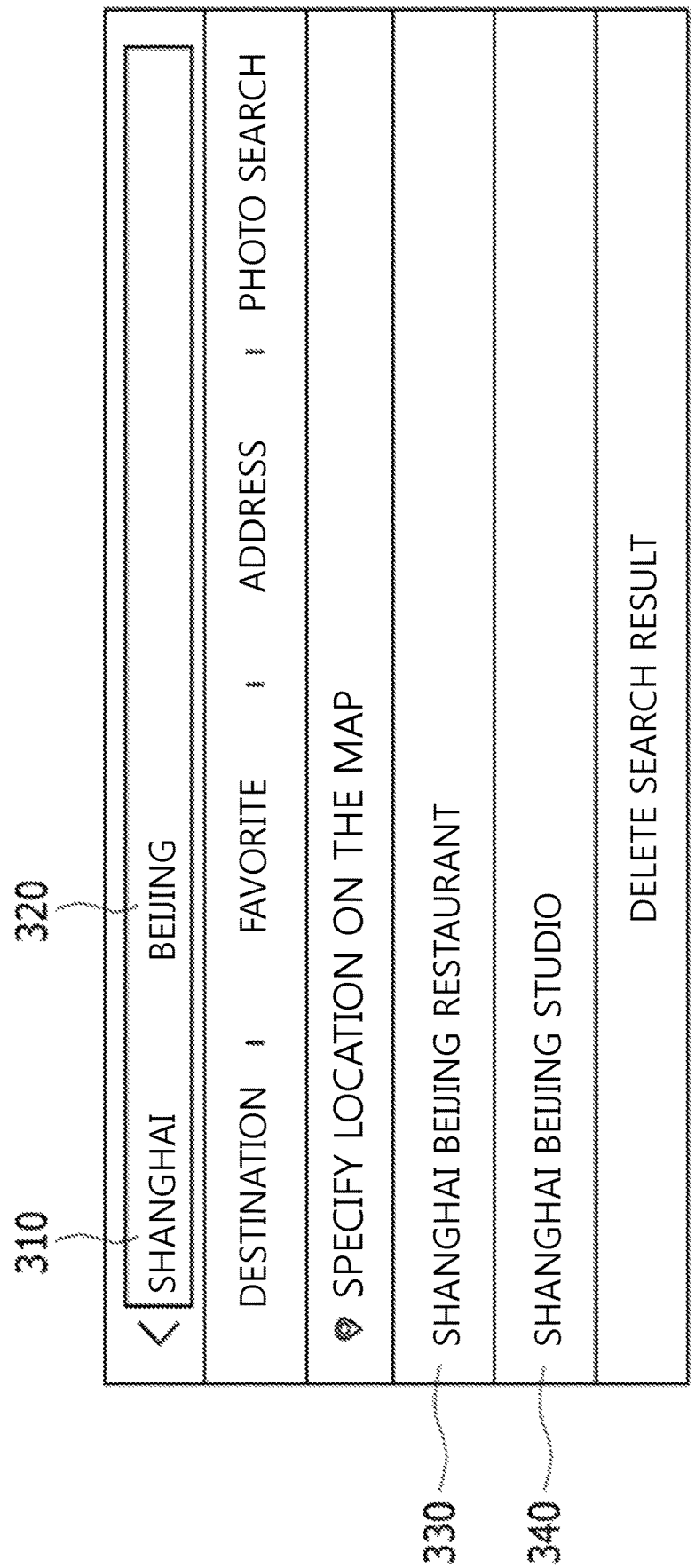

As shown in FIG. 3A, when two words "Shanghai" (310) and "Beijing" (320) are sequentially inputted as a search term, as shown in FIG. 3B, search for POI information within Shanghai corresponding to the first word 310 of the search term in the memory is performed, and then POI information relevant to the second word "Beijing" 320 as retrieved POI information 330, 340 is shown or displayed on the touch screen.

Figure 4A:
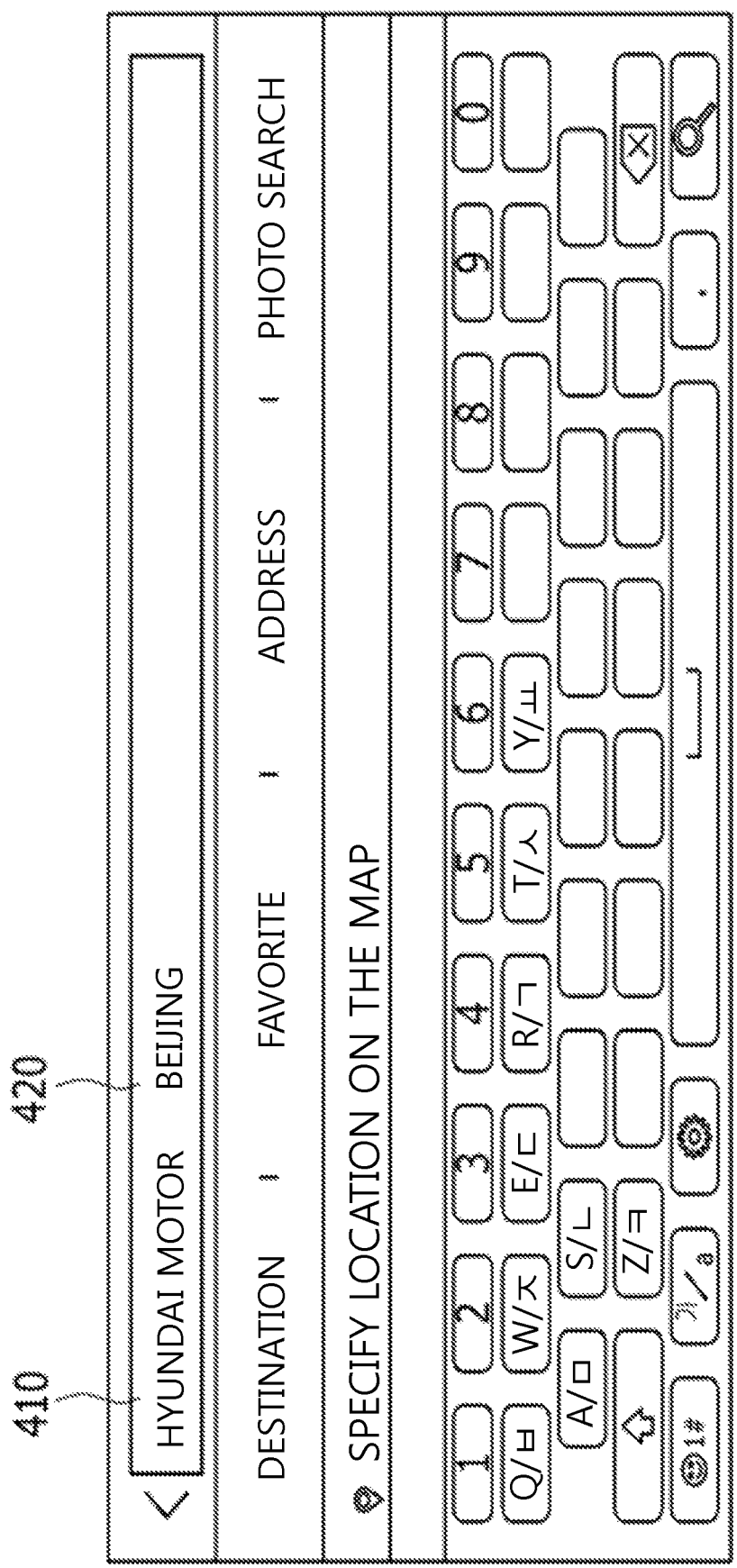
Figure 4B:
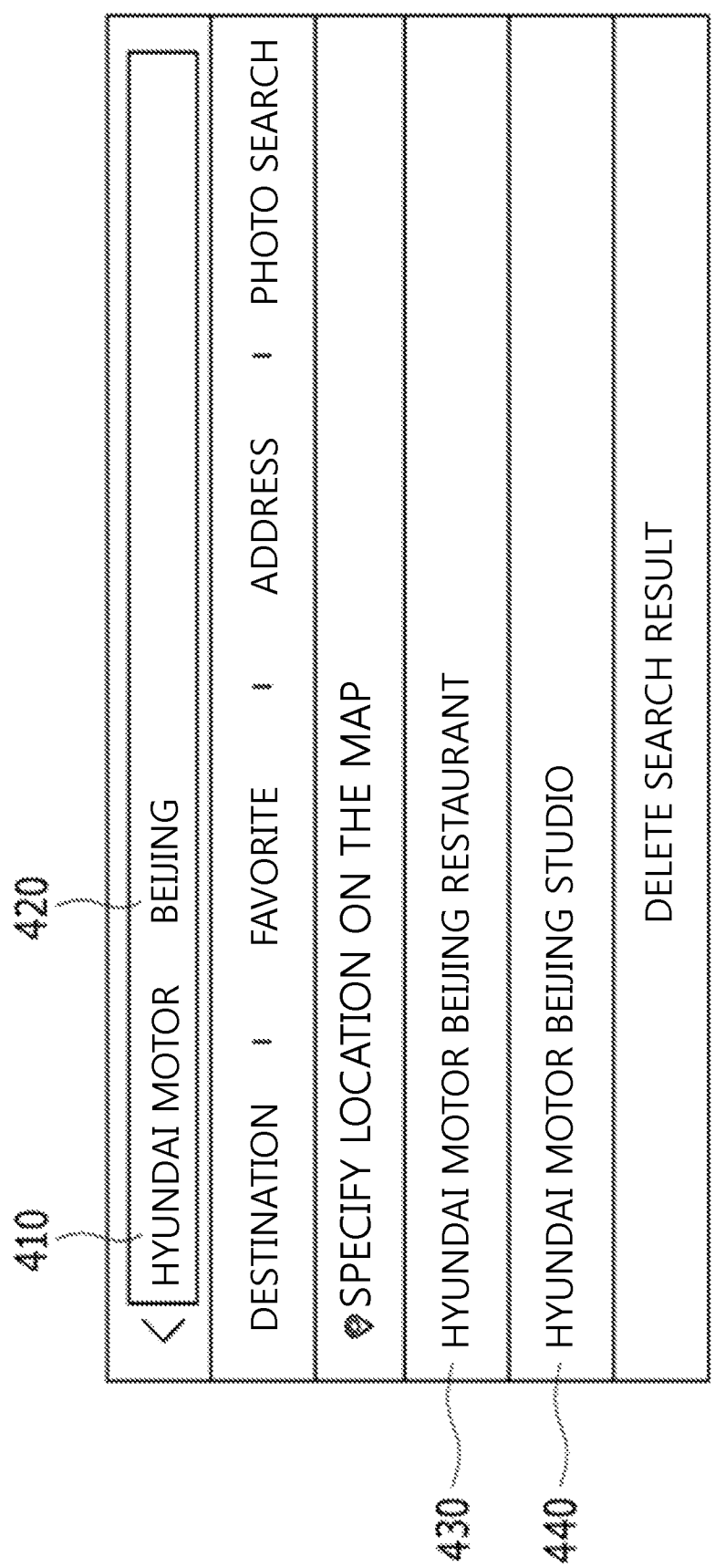

Next, as shown in FIG. 4A, when a search term including "Hyundai Motor" (410) and "Beijing" (420) sequentially is received, POI information 430, 440 including the "Hyundai Motor" (POI name) 410 and the "Beijing" (area name) 420 sequentially can be retrieved from the memory and displayed on the touch screen as illustrated in FIG. 4B.

According to at least one embodiment of the present disclosure configured as described above, a navigation device and a POI search method thereof can quickly and easily search desired POI information within a desired area without setting up an area or a regional code which would have been required to be further provided by a driver or a user.

The aforementioned embodiments are achieved in the disclosed subject matter in a predetermined manner. Each of the structural combination of structural elements and features of the elements or features can be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it will be apparent that some claims referring to specific claims may be combined with another claim referring to the other claim other than the specific claim to constitute the embodiment or add new claims by means of amendment after the application is filed.

Various embodiments may be implemented using a machine-readable medium having instructions stored thereon for execution by a processor to perform various methods presented herein. Examples of possible machine-readable media include HDD (Hard Disk Drive), SSD (Solid State Disk), SDD (Silicon Disk Drive), ROM, RAM, CD-ROM, a magnetic tape, a floppy disk, an optical data storage device, the other types of storage media presented herein, and combinations thereof. If desired, the machine-readable medium may be realized in the form of a carrier wave (for example, a transmission over the Internet).

It will be apparent to those skilled in the art that various modifications and variations can be made in the present disclosure without departing from the spirit or scope of the disclosure. Thus, it is intended that the disclosure covers the modifications and variations of this disclosure provided they come within the scope of the appended claims and their equivalents.

What is claimed is:

1. A navigation device, comprising:
a touch screen configured to receive a search term and to display at least one Point To Interest (POI) information corresponding to the search term;
a computer-readable memory configured to store a POI data by region; and
a controller configured to split the search term into at least two parts including a front portion and a second portion next to the front portion, determine a target region based on the second portion, find a matched POI data among POI data related to the target region based on the whole of the search term, and output a search result as the at least one POI information into the touch screen,
wherein, when the front portion of the search term is not matched with any region and the second portion next to the front portion of the search term is matched with any region, the target region is determined from the second portion next to the front portion of the search term, and a first POI data is searched based on a word of the second portion within the determined target region,
wherein when all of the front portion and the second portion of the search term are matched with any region, the target region is determined from the front portion of the search term, and a second POI data is searched based on a word of the second portion within the determined target region, and
wherein the first POI data includes a name of the target region and the second POI data includes a name of region corresponding to the word of the second portion.

2. The navigation device according to claim 1, wherein the touch screen is configured to display a virtual keypad, and the controller is configured to recognize the search term by character inputted through the virtual keypad.

3. The navigation device according to claim 1, further comprising a microphone configured to receive a voice corresponding to the search term,
wherein the controller is configured to convert the voice received through the microphone into a text and recognize the text by character.

4. The navigation device according to claim 1, wherein the search term is recognized into the at least two parts, depending upon an attribute of a previously established writing pattern.

5. The navigation device according to claim 1, wherein the controller is further configured to analyze the search term to make a history pattern, store or update the history pattern in the computer-readable memory, and load the history pattern whenever the search term is entered.

6. The navigation device according to claim 5, wherein the front portion includes at least two words/syllables/characters, and the history pattern provides how the at least two words/syllables/characters are matched with one of at least two names of different scaled places.

7. The navigation device according to claim 6, wherein the controller is configured to determine, depending upon the history pattern, the target region based on the at least two words/syllables/characters in phases.

8. The navigation device according to claim 6, wherein a first word/syllable/character and a second word/syllable/character are matched with a name of province and a name of city respectively, or vice versa.

9. The navigation device according to claim 1, wherein the controller is configured to determine, when the second portion is not matched with any region, the target region based on a third portion next to the second portion.

10. The navigation device according to claim 1, wherein the search term is split into the at least two parts by free morpheme, and the controller is configured to determine the target region based on at least one recognized free morpheme.

11. A method for searching a Point To Interest (POI) information in a navigation device, the method comprising:
storing POI information classified by region in a computer-readable memory;
receiving a search term inputted through an interface;
recognizing at least two parts contained in the search term, depending upon an attribute of a previously established writing pattern;
retrieving, from the computer-readable memory, at least one POI information contained within a target region associated with one of the at least two parts; and
displaying a searched result on a screen,
wherein the at least two parts of the search term include a front portion and a second portion next to the front portion, and
wherein, when the front portion of the search term is not matched with any region and the second portion next to the front portion of the search term is matched with any region, the target region is determined from the second portion next to the front portion of the search term, and a first POI data is searched based on a word of the second portion within the determined target region,
wherein when all of the front portion and the second portion of the search term are matched with any region, the target region is determined from the front portion of the search term, and a second POI data is searched based on a word of the second portion within the determined target region, and
wherein the first POI data includes a name of the target region and the second POI data includes a name of region corresponding to the word of the second portion.

12. The method according to claim 11, wherein the interface comprises a screen configured to display a virtual keypad and receive any input through the virtual keypad, and wherein the method further comprises recognizing the search term by character inputted through the virtual keypad.

13. The method according to claim 11, wherein the interface comprises a microphone configured to a voice corresponding to the search term, and
wherein the recognizing the at least two parts comprises converting the voice into a text and splitting the text into the at least two parts.

14. The method according to claim 11, wherein each part of the at least two parts comprises includes at least one free morpheme.

15. The method according to claim 11, further comprising:
analyzing the search term to make a history pattern,
storing or updating the history pattern in the computer-readable memory; and
loading the history pattern whenever the search term is recognized.

16. The method according to claim 15, wherein the front portion includes at least two words/syllables/characters, and the history pattern provides how the at least two words/syllables/characters are matched with one of at least two names of different scaled places.

17. The method according to claim 16, further comprising:
determining, based on the history pattern, the target region based on the at least two words/syllables/characters in phases.

18. The method according to claim 16, wherein a first word/syllable/character and a second word/syllable/character are matched with a name of province and a name of city respectively, or vice versa.

19. An apparatus for searching a Point of Interest (POI) information, engaged with GPS device equipped with a vehicle, comprising a processing system that comprises at least one data processor and at least one computer-readable memory storing a computer executable instructions, wherein the processing system is configured to cause the apparatus to:
- store POI information classified by region in the at least one computer-readable memory;
- receive a search term inputted through an interface;
- recognize at least two parts contained in the search term, depending upon an attribute of a previously established writing pattern;
- retrieve at least one POI information, contained within a target region associated with one of the at least two parts, from the at least one computer-readable memory; and
- display a searched result on a screen, wherein the at least two parts of the search term include a front portion and a second portion next to the front portion, and wherein, when the front portion of the search term is not matched with any region and the second portion next to the front portion of the search term is matched with any region, the target region is determined from the second portion next to the front portion of the search term, and a first POI data is searched based on a word of the second portion within the determined target region, wherein when all of the front portion and the second portion of the search term are matched with any region, the target region is determined from the front portion of the search term, and a second POI data is searched based on a word of the second portion within the determined target region, and wherein the first POI data includes a name of the target region and the second POI data includes a name of region corresponding to the word of the second portion.

* * * * *